United States Patent
Yoshikawa et al.

(10) Patent No.: US 11,183,680 B2
(45) Date of Patent: *Nov. 23, 2021

(54) NONAQUEOUS ELECTROLYTE BATTERY (71) Applicant: KABUSHIKI KAISHA TOSHIBA, Minato-ku (JP)

(72) Inventors: Hikaru Yoshikawa, Kashiwazaki (JP); Kazuya Kuriyama, Saku (JP); Hidesato Saruwatari, Kashiwazaki (JP); Masanori Tanaka, Kashiwazaki (JP); Tetsuro Kano, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 239 days.

This patent is subject to a terminal disclaimer.

(21) Appl. No.: 16/429,946

(22) Filed: Jun. 3, 2019

(65) Prior Publication Data
US 2019/0288274 A1 Sep. 19, 2019

Related U.S. Application Data (63) Continuation of application No. 14/477,099, filed on Sep. 4, 2014, now Pat. No. 10,374,220.

(30) Foreign Application Priority Data

Sep. 18, 2013 (JP) .................................. 2013-193475
Sep. 2, 2014 (JP) .................................. 2014-177776

(51) Int. Cl.
*H01M 4/131* (2010.01)
*H01M 4/525* (2010.01)
(Continued)

(52) U.S. Cl.
CPC ........... *H01M 4/131* (2013.01); *H01M 4/366* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS 10,374,220 B2 * 8/2019 Yoshikawa ........... H01M 4/485
2002/0122983 A1 9/2002 Nakai
(Continued)

FOREIGN PATENT DOCUMENTS

CN 101110473 A 1/2008
CN 101421867 A 4/2009
(Continued)

OTHER PUBLICATIONS

Extended European Search Report dated Jan. 9, 2015 in Patent Application No. 14183531.4.
(Continued)

*Primary Examiner* — Alix E Eggerding
(74) *Attorney, Agent, or Firm* — Oblon, McClelland, Maier & Neustadt, L.L.P.

(57) ABSTRACT

According to one embodiment, there is provided a nonaqueous electrolyte battery including a positive electrode. The positive electrode includes a positive electrode active material-containing layer. The positive electrode active material-containing layer includes at least one lithium-nickel composite oxide and a conductive agent. The positive electrode active material-containing layer has, in a particle size distribution obtained by a laser diffraction scattering method, an average particle diameter $d_{50}$ within a range of 1 μm to 5.5 μm, a maximum particle diameter within a range of 10 μm to 100 μm, a particle diameter $d_{10}$ within a range of 0.5 μm to 3 μm, and X, represented by $X=(d_{50}-d_{10})/d_{50}$, within a range of 0.5 to less than 1.

10 Claims, 3 Drawing Sheets

(51) Int. Cl.
  *H01M 4/62*      (2006.01)
  *H01M 4/505*     (2010.01)
  *H01M 4/485*     (2010.01)
  *H01M 10/0525*   (2010.01)
  *H01M 4/36*      (2006.01)
  *H01M 4/02*      (2006.01)

(52) U.S. Cl.
  CPC ........... *H01M 4/525* (2013.01); *H01M 4/623* (2013.01); *H01M 4/625* (2013.01); *H01M 10/0525* (2013.01); *C01P 2004/51* (2013.01); *C01P 2004/61* (2013.01); *H01M 2004/021* (2013.01); *Y02T 10/70* (2013.01)

(56) References Cited

U.S. PATENT DOCUMENTS

| | | |
|---|---|---|
| 2007/0009797 A1 | 1/2007 | Takami et al. |
| 2008/0020271 A1 | 1/2008 | Sato |
| 2009/0104526 A1 | 4/2009 | Tanino et al. |
| 2010/0196761 A1 | 8/2010 | Tatsumi et al. |
| 2010/0285349 A1 | 11/2010 | Goto |
| 2012/0156560 A1 | 6/2012 | Hong et al. |
| 2012/0202113 A1 | 8/2012 | Hodge |
| 2012/0276454 A1 | 11/2012 | Mori |
| 2012/0295157 A1 | 11/2012 | Nagai et al. |
| 2013/0074711 A1 | 3/2013 | Uematsu |
| 2013/0189584 A1 | 7/2013 | Inagaki et al. |
| 2013/0288114 A1 | 10/2013 | An |
| 2014/0127585 A1 | 5/2014 | Kojima |

FOREIGN PATENT DOCUMENTS

| | | |
|---|---|---|
| CN | 102368551 A | 3/2012 |
| CN | 102449822 A | 5/2012 |
| CN | 102714301 A | 10/2012 |
| JP | 10-228895 A | 8/1998 |
| JP | 10-312792 A | 11/1998 |
| JP | 11-1324 A | 1/1999 |
| JP | 2002-141060 | 5/2002 |
| JP | 2005-251684 A | 9/2005 |
| JP | 2005-276597 A | 10/2005 |
| JP | 2006-151707 A | 6/2006 |
| JP | 2006-179367 A | 7/2006 |
| JP | 2010-245050 A | 10/2010 |
| JP | 2011-70789 A | 4/2011 |
| JP | 2011-181387 | 9/2011 |
| JP | 2012-9276 | 1/2012 |
| JP | 2012-116720 A | 6/2012 |
| WO | WO 2008/091028 A1 | 7/2008 |

OTHER PUBLICATIONS

Combined Chinese Office Action and Search Report dated Apr. 28, 2016 in Patent Application No. 201410474630.2 (with English translation of Categories of Cited Documents).

Robert Dominko et al., "The role of carbon black distribution in cathodes for Li ion batteries", Journal of Power Sources 119-121 (2003) pp. 770-773.

* cited by examiner

NONAQUEOUS ELECTROLYTE BATTERY

CROSS-REFERENCE TO RELATED APPLICATIONS

This application a continuation of and is based upon and claims the benefit under 35 U.S.C. § 120 from U.S. Ser. No. 14/477,099, filed Sep. 4, 2014; and is based upon and claims the benefit of priority from the Japanese Patent Applications No. 2013-193475, filed Sep. 18, 2013; and No. 2014-177776, filed Sep. 2, 2014. The entire contents of all of the above are incorporated herein by reference.

FIELD

Embodiments described herein relate generally to a nonaqueous electrolyte battery.

BACKGROUND

Lithium ion secondary batteries, which are nonaqueous electrolyte batteries, are in widespread use by introducing the batteries to electronic devices such as smartphones and laptop type personal computers, and vehicles such as hybrid cars, plug-in hybrid cars and electric cars. The lithium ion secondary battery can be produced, for example, by putting an electrode group, which is obtained by laminating a positive electrode and a negative electrode via a separator sandwiched therebetween, or by spirally winding the laminate formed in this way, in a container including aluminum or aluminum alloy as a material, and injecting an electrolyte solution, which is prepared by dissolving an electrolyte salt including lithium in a nonaqueous solvent, into the container.

Issues related to lithium ion secondary batteries include increasing a capacity and prolonging the life thereof, and it has been desired for such batteries to have a large capacity and exhibit good charge-and-discharge cycle characteristics.

One of the measures for increasing the capacity of the lithium ion secondary battery is to use a lithium-nickel composite oxide as a positive electrode active material. The lithium-nickel composite oxide, however, easily causes a side reaction on an electrode, and has a defect by which the capacity thereof may possibly be reduced when the cycle is repeated.

DETAILED DESCRIPTION

In general, according to one embodiment, there is provided a nonaqueous electrolyte battery. The nonaqueous electrolyte battery includes a positive electrode, a negative electrode, and a nonaqueous electrolyte. The positive electrode includes a positive electrode current collector and a positive electrode active material-containing layer formed on the positive electrode current collector. The positive electrode active material-containing layer includes at least one lithium-nickel composite oxide and a conductive agent. The positive electrode active material-containing layer has, in a particle size distribution obtained by a laser diffraction scattering method, an average particle diameter $d_{50}$ within a range of 1 μm to 5.5 μm, a maximum particle diameter within a range of 10 μm to 100 μm, a particle diameter $d_{10}$ within a range of 0.5 μm to 3 μm, and X, represented by $X=(d_{50}-d_{10})/d_{50}$, within a range of 0.5 to less than 1.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be appropriately changed by taking the following explanations and known technologies into consideration.

The lithium-nickel composite oxide can serve as a positive electrode active material when it is used for a positive electrode. A nonaqueous electrolyte battery using the lithium-nickel composite oxide as the positive electrode active material can exhibit a good charge-and-discharge capacity. For that reason, the nonaqueous electrolyte battery according to the embodiment can exhibit a good charge capacity.

In addition, the nonaqueous electrolyte battery according to the embodiment has the particle size distribution of the positive electrode active material-containing layer, obtained by the laser diffraction scattering method, satisfying the conditions described above, and thus it can exhibit a good charge-and-discharge cycle characteristic due to the reasons described below.

First, as regards the particle size distribution, the average particle diameter $d_{50}$ within a range of 1 μm to 5.5 μm mainly reflects a particle diameter of the at least one lithium-nickel composite oxide included in the positive electrode active material-containing layer. The average particle diameter $d_{50}$ is also influenced by the content of the lithium-nickel composite oxide in the positive electrode active material-containing layer. The average particle diameter $d_{50}$ in the positive electrode active material-containing layer, accordingly, becomes larger with an increase in the content of the lithium-nickel composite oxide in the positive electrode active material-containing layer, and the average particle diameter $d_{50}$ in the positive electrode active material-containing layer becomes smaller with a decrease in the content of the lithium-nickel composite oxide.

Regarding the particle size distribution, the maximum particle diameter within a range of 10 μm to 100 μm refers to the maximum particle diameter detected when the particle size distribution in the positive electrode active material-containing layer is measured.

Further, regarding the particle size distribution, the particle diameter $d_{10}$ is a particle diameter at which the cumulative frequency from smaller particle diameter in the particle size distribution reaches 10%. That is, the particle diameter $d_{10}$ can be also referred to a 10% accumulation diameter. The particle diameter $d_{10}$ within a range of 0.5 μm to 3 μm reflects a particle diameter of a conductive agent having a smaller particle diameter among conductive agents included in the positive electrode active material-containing layer, and is also influenced by a content thereof.

Additionally, X, which is from 0.5 to less than 1, is a value obtained by finding a difference between the average particle diameter $d_{50}$ and the particle diameter $d_{10}$ in the particle size distribution in the positive electrode active material-containing layer, and dividing the difference by the average particle diameter $d_{50}$, as represented by $X=(d_{50}-d_{10})/d_{50}$. X, accordingly, mainly reflects the particle diameters of the conductive agent included in the positive electrode active material-containing layer and the lithium-nickel composite oxide included in the positive electrode active material-containing layer, and is also influenced by the contents thereof.

The nonaqueous electrolyte battery according to the embodiment has a particle size distribution satisfying the conditions described above, and thus the positive electrode active material-containing layer includes the conductive agent, which has a particle diameter sufficiently smaller than the particle diameter of the lithium-nickel composite oxide and is sufficiently dispersed. As a result, the lithium-nickel composite oxide is coated with small particles of the conductive agent in the positive electrode active material-containing layer. The presence of such a coating of the small particles of the conductive agent enables to suppress a side reaction of the lithium-nickel composite oxide in the positive electrode during the charge and discharge, and to suppress the decrease of the charge-and-discharge capacity caused by cycling.

In the nonaqueous electrolyte battery according to the embodiment, the small particles of the conductive agent, which coat the lithium-nickel composite oxide, can form a good conduction path.

As a result, the nonaqueous electrolyte battery according to the embodiment can exhibit good charge-and-discharge cycle characteristics.

A value of X of the positive electrode active material-containing layer of less than 0.5 means that the difference between the average particle diameter $d_{50}$ and the particle diameter $d_{10}$ in the particle size distribution is too small. The following three factors can be considered as reasons why the difference between the average particle diameter $d_{50}$ and the particle diameter $d_{10}$ in the particle size distribution becomes too small, but in any case, a good charge-and-discharge cycle characteristic, as described above, cannot be exhibited.

First, it can be considered that the difference between the particle diameter of the conductive agent and the particle diameter of the lithium-nickel composite oxide is too small, i.e., the particle diameter of the conductive agent is close to the particle diameter of the lithium-nickel composite oxide. When the particles of the lithium-nickel composite oxide are coated with the conductive agent particles having a particle diameter similar to that of the oxide particles, gaps are very likely to be generated between the particles, and thus a satisfactory coating with the conductive agent cannot be obtained. In a nonaqueous electrolyte battery using such a layer, the side reaction of the lithium-nickel composite oxide cannot be suppressed during the charge and discharge. In this case too, the positive electrode also does not have a good conduction path. As a result, in the nonaqueous electrolyte battery using such a layer, the charge-and-discharge capacity is decreased when the cycle is repeated.

Second, it can be considered that the particle diameter of the lithium-nickel composite oxide is too small. The smaller the particle diameter, the larger the surface area of the lithium-nickel composite oxide. The lithium-nickel composite oxide having a large surface area promotes a side reaction with a nonaqueous solvent and a side reaction with an electrolyte during the charge and discharge. In a nonaqueous electrolyte battery including such a lithium-nickel composite oxide as the positive electrode, the charge-and-discharge capacity is decreased when the cycle is repeated.

Finally, it can be considered that an amount of the small particles of the conductive agent included in the positive electrode active material-containing layer is insufficient compared to that of the lithium-nickel composite oxide. In that case, a satisfactory coating of the lithium-nickel composite oxide with the small particles of the conductive agent cannot be obtained, and the side reaction of the lithium-nickel composite oxide cannot be suppressed when the nonaqueous electrolyte battery is charged or discharged. In that case too, the positive electrode active material-containing layer cannot have a good conduction path.

As described above, the nonaqueous electrolyte battery having a positive electrode active material-containing layer with an X value of less than 0.5 cannot exhibit a good charge-and-discharge cycle characteristic.

The particle diameter $d_{50}$ and the particle diameter $d_{10}$ of the positive electrode active material-containing layer regarding the particle size distribution are both positive values, and $d_{50}$ is always larger than $d_{10}$. For that reason, the value of X of the positive electrode active material-containing layer is not 1 or more nor a negative value.

When the maximum particle diameter in the positive electrode active material-containing layer in the particle size distribution is larger than 100 μm, it is difficult to produce a positive electrode having uniform quality. When the maximum particle diameter is smaller than 10 μm, the surface area of the lithium-nickel composite oxide becomes larger. As described above, in the nonaqueous electrolyte battery including the lithium-nickel composite oxide having a large surface area as the positive electrode, it is possible to reduce the charge-and-discharge capacity when the cycle is repeated.

In a positive electrode active material-containing layer in which the particle diameter $d_{10}$, regarding the particle size distribution, is more than 3 μm, it can be considered that the particle diameter of the conductive agent is too large, or that the conductive agent particles are insufficiently dispersed and thus are aggregated in the positive electrode active material-containing layer. In a nonaqueous electrolyte battery including such a layer, sufficient coating with the small particles of the conductive agent cannot be obtained, and the side reaction of the lithium-nickel composite oxide cannot be suppressed and, at the same time, a good conduction path cannot be formed during the charge and discharge.

On the other hand, in the positive electrode active material-containing layer in which the particle diameter $d_{10}$ in the particle size distribution is less than 0.5 μm, both of the conductive agent and the active material have large surface areas, and the side reactivity with the nonaqueous solvent and the side reactivity with the electrolyte are increased; as a result, the charge-and-discharge capacity may possibly be decreased when the cycle is repeated.

In a positive electrode active material-containing layer in which the average particle diameter $d_{50}$, regarding the particle size distribution, is more than 5.5 μm, it can be considered that the particle diameter of the lithium-nickel composite oxide is too large, or that the lithium-nickel composite oxide particles are insufficiently dispersed and thus are aggregated in the positive electrode active material-containing layer. In a nonaqueous electrolyte battery including such a layer, the effect obtained by coating the lithium-nickel composite oxide with the conductive agent, described above, cannot obtained and, at the same time, a good conduction path cannot be formed.

On the other hand, in a positive electrode active material-containing layer in which the average particle diameter $d_{50}$, regarding the particle size distribution, is less than 1 μm, the lithium-nickel composite oxide particles are too small and thus the side reactivity is increased; as a result, the charge-and-discharge capacity may possibly be decreased when the cycle is repeated.

The lithium-nickel composite oxide including the positive electrode active material-containing layer may include, for example, Li—Ni—Al composite oxides, Li—Ni—Co—Mn composite oxides, and Li—Ni—Mn composite oxides. A preferable lithium-nickel composite oxide may include $LiNi_{7/10}Co_{2/10}Mn_{1/10}O_2$, which is one example of the Li—Ni—Co—Mn composite oxide. The positive electrode active material may include one, or two or more lithium-nickel composite oxides.

The content of the nickel element in the positive electrode active material-containing layer is preferably within a range of 23% by weight to 45% by weight. The content of the nickel element in the positive electrode active material-containing layer can be measured, for example, according to inductively coupled plasma atomic spectrometry (ICP analysis). The nonaqueous electrolyte battery according to the embodiment in which the content of the nickel element is 23% by weight or more in the positive electrode active material-containing layer can exhibit a better charge-and-discharge capacity and, at the same time, it can remarkably exhibit the effect of improving the cycle characteristic. The nonaqueous electrolyte battery according to the embodiment in which the content of the nickel element is 45% by weight or less in the positive electrode active material-containing layer can suppress the substitution between the nickel element and the lithium element in the positive electrode active material-containing layer during the charge and discharge and can suppress the change of the structure of the positive electrode active material-containing layer, which lead to an improved cycle characteristic.

The conductive agent included in the positive electrode active material-containing layer includes preferably a carbon material. The conductive agent including the carbon material can provide a better conduction path.

The positive electrode active material-containing layer has preferably a density within a range of 2.4 g/cm³ to 3.6 g/cm³. The nonaqueous electrolyte battery according to the embodiment in which the density of the positive electrode active material-containing layer is within this range can form a better charge-and-discharge path, and can further suppress the side reaction of the lithium-nickel composite oxide. The nonaqueous electrolyte battery according to the embodiment in which the density of the positive electrode active material-containing layer is within the range described above can further suppress variation in impregnating ability of the nonaqueous electrolyte in the positive electrode active material-containing layer. When the impregnating ability of the nonaqueous electrolyte varies in the positive electrode active material-containing layer, the voltage applied to the positive electrode active material-containing layer varies. In a part to which a potential higher than those of other parts is applied in the positive electrode active material-containing layer, side reactions, particularly decomposition of the nonaqueous electrolyte, are promoted.

The density of the positive electrode active material-containing layer can be obtained as follows. First, the weight and the volume of the positive electrode are measured. And then, the weight and the volume of the positive electrode current collector are measured. The difference in weight between the positive electrode and the positive electrode current collector is calculated so as to obtain the weight of the positive electrode active material-containing layer. Similarly, the difference in volume between the positive electrode and the positive electrode current collector is also calculated so as to obtain the volume of the positive electrode active material-containing layer. The density of the positive electrode active material-containing layer can be calculated by divide the weight by the volume.

One example of a procedure of obtaining a particle size distribution of the positive electrode active material-containing layer according to a laser diffraction scattering method, and one example of a procedure of analyzing a content of Ni element in the positive electrode active material-containing layer according to ICP are explained below.

(1) One Example of Procedure of Obtaining Particle Size Distribution of Positive Electrode Active Material-Containing Layer according to Laser Diffraction Scattering Method 1. Disassembly Nonaqueous Electrolyte Battery First, in order to avoid direct contact with an electrode and nonaqueous electrolyte, gloves are put on in advance.

Next, in order to prevent reactions of parts forming a battery with an atmospheric component or moisture during the disassembly, the nonaqueous electrolyte battery is placed in a glove box having an argon atmosphere.

The nonaqueous electrolyte battery is opened in such a glove box. For example, heat-seal parts around a positive electrode tab and a negative electrode tab are cut whereby the nonaqueous electrolyte battery can be opened.

The electrode group is taken out from the nonaqueous opened electrolyte battery. When the electrode group taken out includes a positive electrode lead and a negative electrode lead, the positive electrode lead and the negative electrode lead are cut, while taking care not to short-circuit the positive and negative electrodes.

Next, the electrode group is disassembled into the positive electrode, the negative electrode, and the separator. The thus obtained positive electrode is washed using ethyl methyl carbonate as a solvent.

After the positive electrode is washed, it is subjected to vacuum drying. Alternatively, the electrode may be air dried in an argon atmosphere.

2. Measurement of Particle Size Distribution

The positive electrode active material-containing layer is peeled off from the dried positive electrode using, for example, a spatula.

The powdery sample of the positive electrode active material-containing layer peeled off is put into a cell for measurement filled with N-methyl pyrrolidone until a measurable concentration is obtained. The volume of the cell for measurement and the measurable concentration vary depending on the apparatus for measuring a particle size distribution.

The cell for measurement including N-methyl pyrrolidone and the positive electrode active material-containing layer dissolved therein is irradiated with ultrasonic waves for 5 minutes. The output of the ultrasonic waves is set, for example, within a range of 35 W to 45 W. For example, when about 50 ml of N-methyl pyrrolidone is used as the solvent, the solvent mixed with the sample for measurement is irradiated with ultrasonic waves with an output of about 40 W for 300 seconds. The aggregation between the conductive agent particles and the active material particles can be solved by the ultrasonic wave irradiation.

The cell for measurement, which has been subjected to the ultrasonic wave treatment, is placed in an apparatus for measuring a particle size distribution according to the laser diffraction scattering method, and the particle size distribution is measured. Examples of apparatuses for measuring the particle size distribution include the Microtrac 3100 and Microtrac 3000II. As described above, the particle size distribution of the positive electrode active material-containing layer can be obtained.

(2) One Example of Procedure of Analyzing Content of Ni Element in Positive Electrode Active Material-Containing Layer by ICP First, a nonaqueous electrolyte battery is disassembled and a positive electrode is taken out therefrom in the same manner as in the measurement of the particle size distribution.

The positive electrode taken out is immersed in an ethyl methyl carbonate (MEC) solvent for 20 minutes. Subsequently, MEC is exchanged with a new MEC, and the positive electrode is again immersed therein for 20 minutes.

The positive electrode is taken out from MEC, and the positive electrode is dried in a vacuum at 80° C. for one hour.

One positive electrode having an area of about 70 mm 90 mm is described as a sample to be subjected to the analysis in the following explanation of the procedure.

A positive electrode active material-containing layer is peeled off from the dried positive electrode with a spatula, whereby a sample of the positive electrode active material-containing layer is collected.

Next, the sample of the positive electrode active material-containing layer is put in a beaker, and 20 ml of water is added to the beaker. After that, 20 ml of hydrochloric acid is carefully added thereto little by little.

Next, the beaker is heated, whereby the sample of the positive electrode active material-containing layer is dissolved, and the solution is concentrated until the amount of the solution becomes about half the amount thereof.

After the concentration, the beaker is cooled. After it is cooled, 20 ml of hydrochloric acid and 1 ml of hydrogen peroxide solution are added to the beaker.

Next, the beaker is heated again, and the sample of the positive electrode active material-containing layer, which is not dissolved yet, is completely dissolved, and the solution is concentrated until the amount of the solution becomes about 10 ml.

Next, water is added to the beaker to obtain a liquid amount of about 50 ml, and the solution is heated until it boils.

After it is cooled, the liquid in the beaker is filtered through a filter paper (grade: Grade 5 C), and the obtained filtrate is adjusted using water to a constant volume of 200 ml. The solution thus adjusted to have a constant volume is defined as sample solution A.

Next, sample solution A is diluted with water to an Ni concentration of about 5 to 9 µg/ml. The solution obtained by the dilution is defined as sample solution B.

Meanwhile, a commercially available Ni standard solution (1000 µg/ml) is diluted to prepare a standard solution having a concentration of 0 µg/ml, 5 µg/ml or 10 µg/ml.

Using an ICP emission analyzing apparatus, emission intensities of the standard solutions and the sample solution B are measured. Using the emission intensities of the standard solutions, a calibration curve is made. Using the calibration curve, an Ni concentration of the sample solution B is calculated according to a calibration curve method.

From the results calculated, an Ni content of the positive electrode active material-containing layer is calculated.

Thus, the content of Ni element in the positive electrode active material-containing layer can be analyzed according to ICP.

A nonaqueous electrolyte battery according to an embodiment is explained in more detail below.

The nonaqueous electrolyte battery according to the embodiment has a positive electrode, a negative electrode, and a nonaqueous electrolyte.

The positive electrode includes a positive electrode current collector of and a positive electrode active material-containing layer formed on the positive electrode current collector.

The positive electrode current collector may include a part where the positive electrode active material-containing layer is not formed on its surface, and that part can serve as a positive electrode lead.

For the current collector of the positive electrodes, for example, a foil of metal such as aluminum or copper may be used.

The positive electrode active material-containing layer includes at least one lithium-nickel composite oxide and a conductive agent. The positive electrode active material-containing layer may further include an active material other than the lithium-nickel composite oxide. The other active material, which may be included in the positive electrode active material-containing layer, may include, for example, Li—Mn oxides and Li—Co oxides.

As the conductive agent included in the positive electrode active material-containing layer, as described above, the carbon material is preferable. The carbon material may include, for example, acetylene black, Ketjen black, furnace black, graphite, carbon nanotube, and the like. The positive electrode active material-containing layer may include one kind, or two or more kinds of the carbon material described above, or may further include another conductive agent.

The positive electrode active material-containing layer may also include a binder. The binder, which may be included in the positive electrode active material, is not particularly limited. As the binder, for example, polymers capable of being sufficiently dispersed in a solvent for the mixing in order to prepare slurry. Such a polymer may include, for example, polyvinylidene fluoride, hexafluoropropylene, polytetrafluoroethylene, and the like.

The positive electrode can be produced, for example, in the following method. First, at least one lithium-nickel composite oxide, any other active material, a conductive agent, and any binder are added to an appropriate solvent to obtain a mixture. Subsequently, the obtained mixture is poured into a mixer. The mixture is stirred in the mixer to obtain slurry. The thus obtained slurry is coated on a positive electrode current collector, which is dried and pressed, whereby a positive electrode can be produced. The particle size distribution of the positive electrode active material-containing layer can be adjusted, for example, by adjusting the stirring conditions of the mixture, or a particle diameter of the lithium-nickel composite oxide, to the condition described above.

The aggregation level of the particles of the lithium-nickel composite oxide and the aggregation level of the particles of the conductive agent in the slurry obtained as above reflect the particle size distribution of the positive electrode active material-containing layer, the particle size distribution being obtained by the method described above.

The negative electrode can include a negative electrode current collector and a negative electrode active material-containing layer formed on the negative electrode current collector. The current collector of negative electrodes may include a part where the negative electrode active material-containing layer is not formed on its surface, and that part can serve as a negative electrode lead.

For the negative electrode current collector, for example, a foil of metal such as aluminum or copper may be used.

The negative electrode active material-containing layer may include, for example, a negative electrode active material, a conductive agent, and a binder.

The negative electrode active material, which may be included in the negative electrode active material-containing layer, is not particularly limited. The negative electrode active material may include, for example, a graphite material or carbonaceous material (for example, graphite, coke, carbon fiber, spherical carbon, carbonaceous material obtained by the pyrolytic of the gaseous carbonaceous substance, resin baked material and the like), chalcogen compound (for example, titanium disulfide, molybdenum disulfide, niobium selenide and the like), and light metal (for example, aluminum, aluminum alloy, magnesium alloy, lithium, lithium alloy and the like), lithium-titanium oxides (such as spinel-type lithium titanate), and the like.

For the conductive agent and the binder, which may be included in the negative electrode active material-containing layer, the same conductive agent and binder as those included in the positive electrode active material-containing layer may be used.

The density of the negative electrode active material-containing layer can be obtained by the same procedure as that of measuring the density of the positive electrode active material-containing layer.

The negative electrode can be produced, for example, by the following method. First, a negative electrode active material, a conductive agent, and a binder are mixed. The thus obtained mixture is added to a solvent to prepare slurry. The slurry is coated on a negative electrode current collector, which is dried and pressed, whereby a negative electrode can be produced.

The electrode group can be formed from the positive electrode and the negative electrode by facing the positive electrode active material-containing layer to the negative electrode active material-containing layer through the separator which is sandwiched between them. The separator is not particularly limited, and for example a fine porous film, a woven fabric, a non-woven fabric, or a laminate thereof having the same material or different materials may be used. The material forming the separator may include polyethylene, polypropylene, ethylene-propylene copolymers, ethylene-butene copolymers, cellulose, and the like.

The structure of the thus formed electrode group is not particularly limited. For example, the electrode group may have a stacked structure. The stacked structure is a structure in which the positive electrode and the negative electrode described above, and the separator, which is sandwiched between them, are laminated. Alternatively, the electrode group may have a coiled structure. The coiled structure is a structure in which the positive electrode and the negative electrode described above, and the separator, which is sandwiched between them, are laminated and the thus obtained laminate is spirally wound.

For example, the electrode group is impregnated with a nonaqueous electrolyte.

The nonaqueous electrolyte can be prepared by dissolving an electrolyte (such as a lithium salt) in a nonaqueous solvent.

The nonaqueous solvent may include, for example, ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), 2-methyl tetrahydrofuran, and the like. The nonaqueous solvent may be used alone or as a mixture of two or more kinds.

The electrolyte may include, for example, lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifoulromethanesulfonate ($LiCF_3SO_3$). The electrolyte may be used alone or as a mixture of two or more kinds.

An amount of the electrolyte dissolved in the nonaqueous solvent is desirably from 0.5 mol/L to 3 mol/L. When the electrolyte concentration is too low, a sufficient ionic conductivity may sometimes not be obtained. On the other hand, when it is too high, the electrolyte may sometimes not be completely dissolved in the electrolytic solution.

The nonaqueous electrolyte battery according to the embodiment may further have a container for housing the electrode group and the nonaqueous electrolyte described above.

For the container, for example, aluminum, aluminum alloy, iron (Fe), aluminum-containing laminate films, iron plated with nickel (Ni), or stainless steel (SUS) may be used.

The nonaqueous electrolyte battery according to the embodiment may further include a positive electrode tab, which is electrically connected to the positive electrode lead, and a negative electrode tab, which is electrically connected to the negative electrode lead. The positive electrode tab and the negative electrode tab can also serve as a positive electrode terminal and a negative electrode terminal in a state in which they are pulled out outward from the container. Alternatively, the positive electrode tab and the negative electrode tab may also be connected to the positive electrode terminal and the negative electrode terminal, respectively.

It is desirable that the positive electrode tab, the negative electrode tab, the positive electrode terminal, and the negative electrode terminal are formed from, for example, aluminum or an aluminum alloy.

Figure 1:
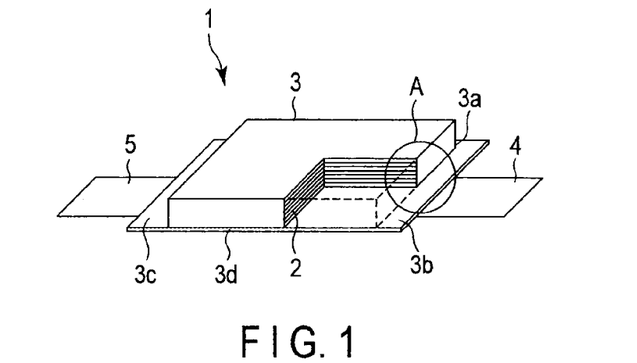
FIG. 1 is a schematically cut-away perspective view showing one example of a nonaqueous electrolyte battery according to an embodiment.
Figure 2:
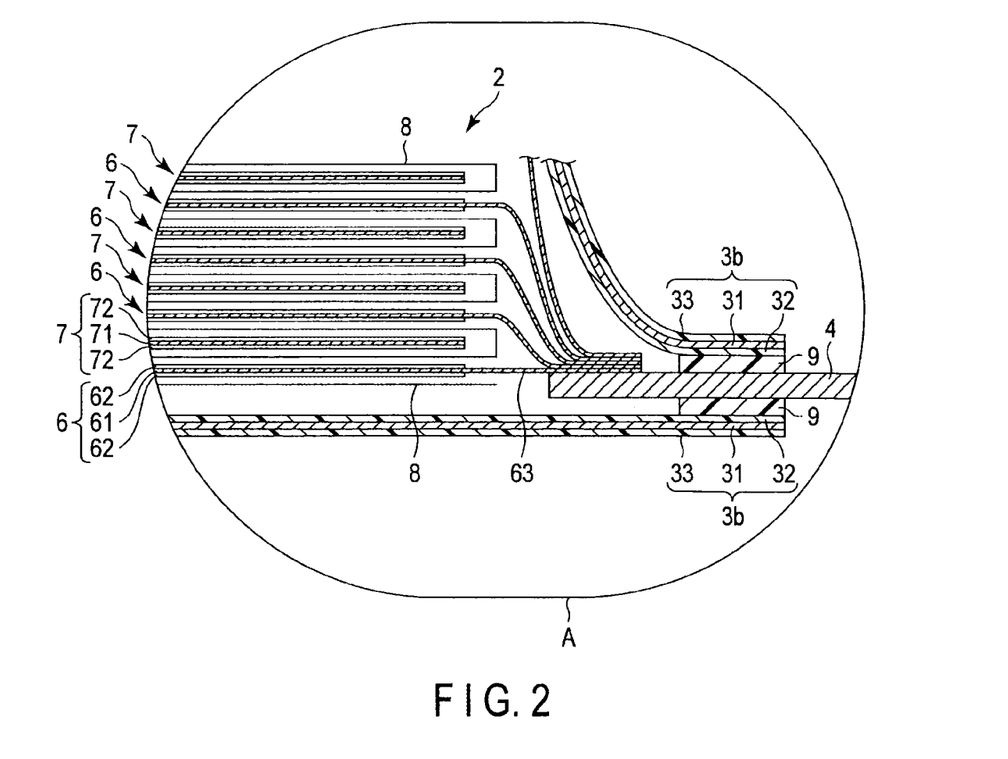
FIG. 2 is a schematically cross-sectional view showing a part A in FIG. 1.
Figure 3:
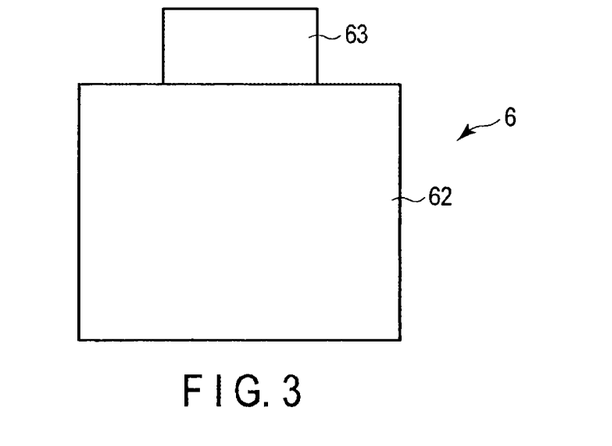
FIG. 3 is a schematically plan view showing a positive electrode provided in one example of a nonaqueous electrolyte battery according to an embodiment.

Next, one example of the nonaqueous electrolyte batteries according to the embodiment is explained in more detail, by referring to FIG. 1 to FIG. 3.

FIG. 1 is an outline cut-away perspective view showing one example of nonaqueous electrolyte batteries according to this embodiment. FIG. 2 is an outline cross-sectional view showing a part A in FIG. 1. FIG. 3 is an outline plan view showing a positive electrode provided in one example of nonaqueous electrolyte batteries according to this embodiment.

A nonaqueous electrolyte battery 1 of a first example, shown in FIG. 1 to FIG. 3, includes an electrode group 2 shown in FIG. 1 and FIG. 2; a container 3 shown in FIG. 1 and FIG. 2; a positive electrode tab 4 shown in FIG. 1 and FIG. 2; and a negative electrode tab 5 shown in FIG. 1.

The electrode group 2 shown in FIG. 1 and FIG. 2 includes multiple positive electrodes 6, multiple negative electrodes 7, and one separator 8.

The positive electrode 6 has a positive electrode current collector 61, and positive electrode active material-containing layers 62 formed on both sides of the positive electrode current collector 61, as shown in FIG. 2 and FIG. 3. Also, as shown in FIG. 2 and FIG. 3, the positive electrode current collector 61 includes a part 63 where the positive electrode active material-containing layer 62 is not formed on its surface, and the part 63 serves as a positive electrode lead. As shown in FIG. 3, the positive electrode lead 63 forms a narrow part whose width is narrower than that of the positive electrode active material-containing layer 62.

The negative electrode 7 has a current collector 71 of negative electrodes and negative electrode active material-containing layers 72 formed on both sides of the current collector 71 of the negative electrodes, as shown in FIG. 2. The current collector 71 of the negative electrodes includes a part where the negative electrode active material-containing layer 72 is not formed on its surface, though it is not shown in the view, and the part serves as a negative electrode lead.

As shown in FIG. 2, the separator 8 is folded in a zigzag. In a space defined by surfaces facing each other of the separator 8 zigzag folded, either of the positive electrode 6 or the negative electrode 7 is arranged. By this structure, the positive electrodes 6 and the negative electrodes 7 are laminated so that each of the positive electrode active material-containing layers 62 and each of the negative electrode active material-containing layers 72 face each other through the separator 8 which is sandwiched between them, as shown in FIG. 2. The electrode group 2 is thus formed.

The positive electrode leads 63 of the electrode group 2 extend from the electrode group 2, as shown in FIG. 2. The positive electrode leads 63 are, as shown in FIG. 2, collected to one, which is connected to the positive electrode tab 4. The negative electrode leads of the electrode group 2 also extend from the electrode group 2, though this is not shown in the view. The negative electrode leads are collected to one, which is connected to the negative electrode tab 5 shown in FIG. 1, though this is not shown in the view.

Such an electrode group 2 is housed in a container 3, as shown in FIG. 1 and FIG. 2.

The container 3 is formed from an aluminum-containing laminate film, which includes an aluminum foil 31 and resin films 32 and 33 formed on both sides of the foil. The aluminum-containing laminate film, which forms the container 3, is folded at a bent portion 3d as a fold so that the resin film 32 faces inward, and the electrode group 2 is housed therein. The container 3 holds the positive electrode tab 4 at its peripheral edge 3b, as shown in FIG. 1 and FIG. 2. Similarly, the container 3 holds the negative electrode tab 5 at its peripheral edge 3c. By this structure, the positive electrode tab 4 and the negative electrode tab 5 extend from the container 3 in an opposite direction to each other.

In the container 3, the peripheral parts 3a, 3b and 3c are heat-sealed by heat fusion of the resin films 32 which face each other, except for the parts where positive electrode tab 4 and the negative electrode tab 5 are held.

In the nonaqueous electrolyte battery 1, in order to improve the bonding strength between the positive electrode tab 4 and the resin film 32, an insulating film 9 is provided between the positive electrode tab 4 and the resin film 32, as shown in FIG. 2. In addition, in the peripheral part 3b, the positive electrode tab 4 and the insulating film 9 are heat-sealed to each other by heat fusion, and the resin film 32 and the insulating film 9 are heat-sealed to each other by heat fusion. Similarly, another insulating film 9 is provided between the negative electrode tab 5 and the resin film 32, though this is not shown in the view. In the peripheral part 3c, also, the negative electrode tab 5 and the insulating film 9 are heat-sealed by heat fusion, and the resin film 32 and the insulating film 9 are heat-sealed by heat fusion. In the nonaqueous electrolyte battery 1 shown in FIG. 1 to FIG. 3, accordingly, all of the peripheral parts 3a, 3b and 3c of the container 3 are heat-sealed.

The container 3 further houses a nonaqueous electrolyte, which is not shown in the views. The electrode group 2 is impregnated with the nonaqueous electrolyte.

Figure 4:
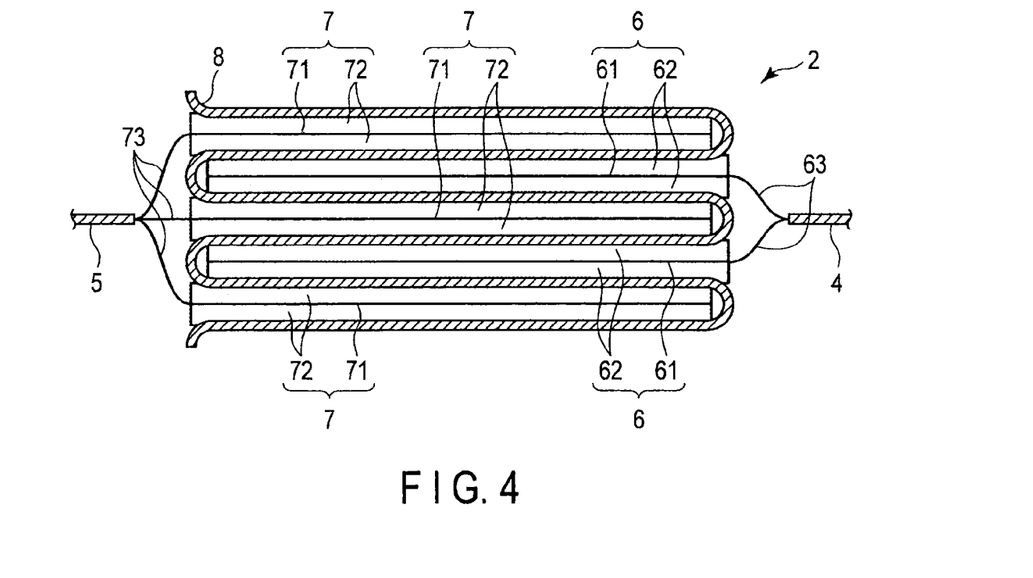
FIG. 4 is a schematically cross-sectional view showing one example of electrode groups, which can be provided in a nonaqueous electrolyte battery according to an embodiment.

In the nonaqueous electrolyte battery 1 shown in FIG. 1 to FIG. 3, the multiple positive electrode leads 63 are collected at the undermost layer of the electrode group 2, as shown in FIG. 2. Similarly, though not shown in the views, the multiple negative electrode leads are collected at the undermost layer of the electrode group 2. As shown, for example, in FIG. 4, however, it is possible that multiple positive electrode leads 63 and multiple negative electrode leads 73 are separately collected around at the middle of the electrode group 2, and connected to the positive electrode tab 4 and the negative electrode tab 5, respectively.

According to the embodiment described above, the nonaqueous electrolyte battery is provided. In the nonaqueous electrolyte battery, the positive electrode active material-containing layer, which includes the at least one lithium-nickel composite oxide and the conductive agent, has the particle size distribution which satisfies the conditions described above. Due to this, the nonaqueous electrolyte battery according to the embodiment can exhibit good charge/discharge cycle characteristics.

EXAMPLE

Examples are described below.

Example 1

In Example 1, a nonaqueous electrolyte battery 1 shown in FIG. 1 to FIG. 3 was produced in the following method.

[Production of Positive Electrode 6]

As a positive electrode active material, $LiNi_{7/10}Co_{2/10}Mn_{1/10}O_2$ having an average particle diameter of 6 μm was used. The active material, acetylene black, graphite, and polyvinylidene fluoride were mixed in a ratio of 100:8:5:3 as follows: First, the active material, the acetylene black, and the graphite were dry-mixed using a Henschel mixer. After they were dry-mixed, polyvinylidene fluoride and N-methyl-2-pyrrolidone were added to the obtained dry mixture, and the resulting mixture was wet-mixed in a planetary mixer. Thus, a mixture including the materials in the ratio described above was prepared.

Subsequently, the prepared mixture was placed in a THINKY MIXER (Japanese Name: Rentaro) (ARE-250), which is a rotation-revolution type mixer manufactured by THINKY, and stirring was performed for 30 minutes while the number of revolutions was set at 2000 rpm. Subsequently, the mixture was moved from the HINKY MIXER to a sand grinder with 4 cylinders, which is a disperser manufactured by IMEX Co., Ltd. Glass beads having a diameter of 0.7 to 1.0 mm were added to the disperser, and stirring was further performed for 30 minutes while the number of revolutions was set at 2000 rpm.

The positive electrode slurry obtained after the stirring was coated on both sides of an aluminum foil 61 having a thickness of 20 μm using a coating apparatus so that an amount of the slurry coated per unit area was 110 g/m². At that time, a part 63 where the slurry was not coated was left on the aluminum foil 61. The obtained coating film was dried, then rolled by using a roll press machine so that an electrode density (a density of a positive electrode active material-containing layer 62) was 2.6 g/cm³. Finally, the part 63 where the slurry was not coated was punched to form a narrow part 63, which served as a positive electrode lead, shown in FIG. 3. Multiple positive electrodes 6 were produced in this way.

[Production of Negative Electrode 7]

As a negative electrode active material, lithium titanate $Li_4Ti_5O_{12}$ was used. The active material, graphite, and polyvinylidene fluoride were mixed in a ratio of 100:9:4. Subsequently, the mixture was kneaded with N-methyl-2-pyrrolidone as a solvent to obtain a mixture. Subsequently, the mixture was stirred to prepare a negative electrode slurry. The obtained negative electrode slurry was coated on an aluminum foil 71 having a thickness of 12 μm using a coating apparatus so that an amount of the slurry coated per unit area of 110 g/m² At that time, a part where the slurry was not coated was left on the aluminum foil 71. The obtained coating film was dried, then rolled by using a roll press machine so that an electrode density (a density of the negative electrode active material-containing layer 72) was 2.4 g/cm³. The part where the slurry was not coated was punched, similarly to formation of the positive electrode 6, to form a narrow part, which served as a negative electrode lead, similarly to the case of the positive electrode 6, shown in FIG. 3. Multiple negative electrodes 7 were produced in this way. [Fabrication of Electrode Group 2]

A fine porous film separator 8 having a band shape and a thickness of 30 μm was prepared. The separator 8 was zigzag folded, and the positive electrodes 6, the negative electrodes 7, and the separator 8 were laminated in the way as explained referring to FIG. 2. At that time, the multiple positive electrode leads 63 and the multiple negative electrode leads were made to extend from the laminate in an opposite direction to each other. Finally, a coiling stop tape, which is not shown in the view, was pasted to the obtained laminate to fabricate an electrode group 2.

[Connection of Positive Electrode Tab 4 and Negative Electrode Tab 5 to Electrode 2]

The positive electrode tab 4 and the negative electrode tab 5 were produced using aluminum. Subsequently, the positive electrode leads 63 of the multiple positive electrodes 6 were collected to one, which was connected to the positive electrode tab 4. Similarly, the negative electrode leads of the multiple negative electrodes 7 were collected to one, which was connected to the negative electrode tab 5. The positive electrode tab 4 and the negative electrode tab 5 were set so that they extend from the electrode group 2 in an opposite direction to each other to be able to easily collect power from the positive electrodes 6 and the negative electrodes 7, as described above.

[Production of Container 3]

For the container 3, an aluminum-containing laminate film was used. First, the aluminum-containing laminate film 3 was shaped into a shape capable of housing the electrode group 2. The electrode group 2 was housed in the thus shaped aluminum-containing laminate film 3, as described above, referring to FIG. 1 and FIG. 2. At that time, as shown in FIG. 2, the positive electrode tab 4 was held by the resin film 32 at the peripheral part 3b of the container 3. Similarly, though not shown in FIG. 2, the negative electrode tab 5 was held by the resin film 32 at the peripheral part 3c of the container 3. The insulating films 9 were arranged between the positive electrode tab 4 and the resin film 32, and between the negative electrode tab 5 and the resin film 32, respectively.

Subsequently, the resin films 32, facing each other, were fixed by heat fusion at the peripheral parts 3a, 3b, and 3c with a part of the resin film 32 being left as they were. At the same time, at the peripheral part 3b, the resin film 32 was fixed to the insulating film 9 facing thereto by heat fusion, and the positive electrode tab 4 was fixed to the insulating film 9 facing thereto by heat fusion. Similarly, at the peripheral part 3c, the resin film 32 was fixed to the insulating film 9 facing thereto by heat fusion, and the negative electrode tab 5 was fixed to the insulating film 9 facing thereto by heat fusion. Thus, a cell before injection of a nonaqueous electrolyte was assembled.

[Injection of Nonaqueous Electrolyte]

For the nonaqueous electrolyte, a mixed solvent of ethylene carbonate and dimethyl carbonate in a ratio of 1:1 was used as a nonaqueous solvent, and 2 mol/l of lithium hexafluorophosphate was used as an electrolyte. The nonaqueous electrolyte was injected into the cell before injection of the nonaquesous electrolyte, described above. The nonaqueous electrolyte was injected through the peripheral parts of the container 3 where heat fusion had not been performed, which were left as-is.

[Production of Nonaqueous Electrolyte Battery 1]

Finally, the peripheral parts of the container 3 where heat fusion had not been performed and were left as-is were heat-sealed to produce a nonaqueous electrolyte battery 1.

[Evaluation]

As for the thus produced nonaqueous electrolyte battery 1 of Example 1, the charge-and-discharge cycle characteristic and the particle size distribution of the positive electrode active material-containing layer 62 were measured as follows:

(Charge and Discharge Cycle Characteristic)

Charge and discharge of the nonaqueous electrolyte battery 1 from Example 1 was repeated 300 times in an atmosphere having a temperature of 60° C. At that time, the charge and the discharge were both performed at a current value of 2 C. A capacity at the first cycle (the first charge and discharge) and a capacity at the 300th cycle were measured.

A value obtained by dividing the capacity obtained at the 300th cycle by the capacity at the first cycle was defined as a capacity retention ratio after 300 cycles.

The nonaqueous electrolyte battery 1 from Example 1 had a capacity retention ratio of 90% after 300 cycles.

(Measurement of Particle Size Distribution of Positive Electrode Active Material-Containing Layer 62)

As for the nonaqueous electrolyte battery 1 from Example 1, the particle size distribution was measured using the method previously described in the laser diffraction scattering-type apparatus for measuring a particle diameter and a particle size distribution. The obtained particle size distribution is shown as a solid line in FIG. 5.

Regarding the particle size distribution of the positive electrode active material-containing layer 62 in the nonaqueous electrolyte battery 1 from Example 1, the average particle diameter $d_{50}$ was 3.7 μm, the particle diameter $d_{10}$ was 1.00 μm, the maximum particle diameter was 14.5 μm, and X, represented by $X=(d_{50}-d_{10})/d_{50}$, was 0.73.

Example 2

In Example 2, a nonaqueous electrolyte battery 1 was produced in the same manner as in Example 1, except that the number of revolutions in the sand grinder was changed to 1000 rpm.

As for the nonaqueous electrolyte battery 1 from Example 2, the charge-and-discharge cycle characteristic and the particle size distribution were evaluated in the same manner as in Example 1.

The nonaqueous electrolyte battery 1 from Example 2 had a capacity retention ratio of 85% after 300 cycles.

Regarding the particle size distribution of the nonaqueous electrolyte battery 1 from Example 2, the average particle diameter $d_{50}$ was 3.9 µm, the particle diameter $d_{10}$ was 1.37 µm, the maximum particle diameter was 15.4 µm, and X was 0.65.

Example 3

In Example 3, a nonaqueous electrolyte battery 1 was produced in the same manner as in Example 1, except that as the positive electrode active material, $LiNi_{7/10}Co_{2/10}Mn_{1/10}O_2$ having an average particle diameter of 5 µm was used.

As for the nonaqueous electrolyte battery 1 from Example 3, the charge-and-discharge cycle characteristic and the particle size distribution were evaluated in the same manner as in Example 1.

The nonaqueous electrolyte battery 1 from Example 3 had a capacity retention ratio of 94% after 300 cycles. Regarding the particle size distribution of the nonaqueous electrolyte battery 1 from Example 3, the average particle diameter $d_{10}$ was 3.0 µm, the particle diameter $d_{10}$ was 0.90 µm, the maximum particle diameter was 13.1 µm, and X was 0.70.

Example 4

In Example 4, a nonaqueous electrolyte battery 1 was produced in the same manner as in Example 1, except that as the positive electrode active material, $LiNi_{7/10}Co_{2/10}Mn_{1/10}O_2$ having an average particle diameter of 5 µm was used and the number of revolutions of the sand grinder was changed to 1000 rpm.

As for the nonaqueous electrolyte battery 1 from Example 4, the charge-and-discharge cycle characteristic and the particle size distribution were evaluated in the same manner as in Example 1.

The nonaqueous electrolyte battery 1 from Example 4 had a capacity retention ratio of 89% after 300 cycles. Regarding the particle size distribution of the nonaqueous electrolyte battery 1 from Example 4, the average particle diameter $d_{50}$ was 3.6 µm, the particle diameter $d_{10}$ was 1.51 µm, the maximum particle diameter was 15.6 µm, and X was 0.58.

Comparative Example 1

In Comparative Example 1, a nonaqueous electrolyte battery 1 was produced in the same manner as in Example 1, except that the stirring of the slurry in the sand grinder was omitted.

As for the nonaqueous electrolyte battery 1 from Comparative Example 1, the charge-and-discharge cycle characteristic and the particle size distribution were evaluated in the same manner as in Example 1.

Figure 5:
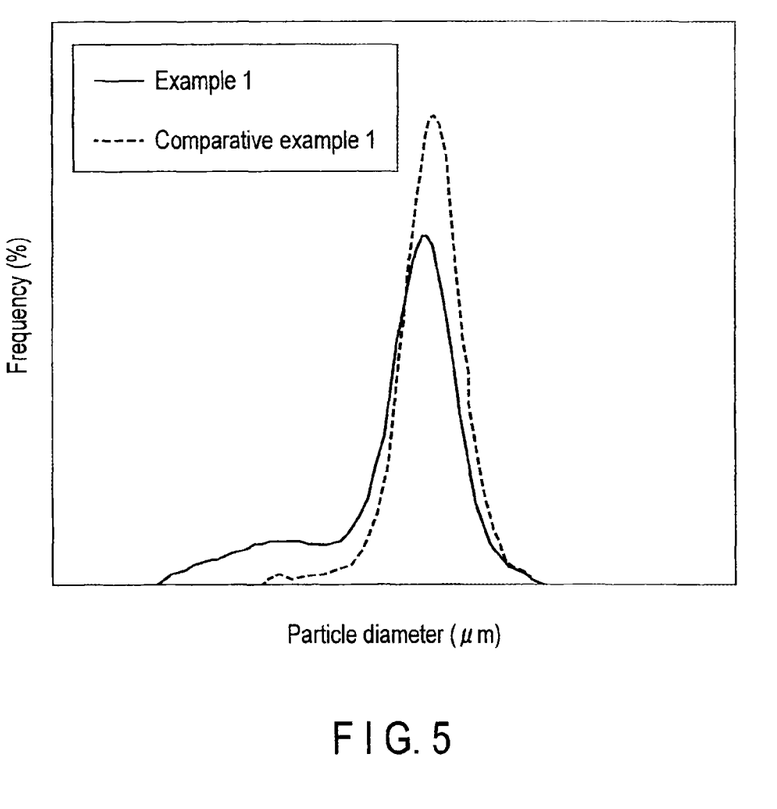
FIG. 5 shows particle size distributions of a positive electrode active material-containing layer in a positive electrode provided in a nonaqueous electrolyte battery of Example 1 and a positive electrode active material-containing layer in a positive electrode provided in a nonaqueous electrolyte battery of Comparative Example 1.

The particle size distribution obtained from the nonaqueous electrolyte battery 1 of Comparative Example 1 is shown as a dotted line in FIG. 5.

The nonaqueous electrolyte battery 1 from Comparative Example 1 had a capacity retention ratio of 58% after 300 cycles. Regarding the particle size distribution of the nonaqueous electrolyte battery 1 from Comparative Example 1, the average particle diameter $d_{50}$ was 4.5 µm, the particle diameter $d_{10}$ was 2.97 µm, the maximum particle diameter was 14.3 µm, and X was 0.34.

Comparative Example 2

In Comparative Example 2, a nonaqueous electrolyte battery 1 was produced in the same manner as in Example 1, except that as the positive electrode active material, $LiNi_{7/10}Co_{2/10}Mn_{1/10}O_2$ having an average particle diameter of 10 µm was used.

As for the nonaqueous electrolyte battery 1 from Comparative Example 2, the charge-and-discharge cycle characteristic and the particle size distribution were evaluated in the same manner as in Example 1.

The nonaqueous electrolyte battery 1 from Comparative Example 2 had a capacity retention ratio of 70% after 300 cycles. Regarding the particle size distribution of the nonaqueous electrolyte battery 1 from Comparative Example 2, the average particle diameter $d_{50}$ was 7.0 µm, the particle diameter $d_{10}$ was 1.54 µm, the maximum particle diameter was 13.8 µm, and X was 0.78.

The results in Examples 1 to 4 and Comparative Examples 1 and 2 are summarized in Tables 1 and 2 below.

TABLE 1

|  | Average Particle Diameter $D_{50}$ (µm) | Number of Revolution of Sand Grinder (rpm) | X | Capacity Retention Ratio after 300 cycles (%) |
|---|---|---|---|---|
| Example 1 | 3.7 | 2000 | 0.73 | 90 |
| Example 2 | 3.9 | 1000 | 0.65 | 85 |
| Example 3 | 3.0 | 2000 | 0.70 | 94 |
| Example 4 | 3.6 | 1000 | 0.58 | 89 |
| Comparative Example 1 | 4.5 | Not done | 0.34 | 58 |

TABLE 2

|  | $D_{10}$ (µm) | Maximum Particle Diameter (µm) |  |  |
|---|---|---|---|---|
| Example 1 | 1.00 | 14.5 |  |  |
| Example 2 | 1.37 | 15.4 |  |  |
| Example 3 | 0.90 | 13.1 |  |  |
| Example 4 | 1.51 | 15.6 |  |  |
| Comparative Example 1 | 2.97 | 14.3 |  |  |
| Comparative Example 2 | 1.54 | 13.8 |  |  |
| Comparative Example 2 | 7.0 | 2000 | 0.78 | 70 |

[Results]

As shown in Tables 1 and 2, the nonaqueous electrolyte batteries 1 from Examples 1 to 4 exhibited better capacity retention ratios after 300 cycles than those of the nonaqueous electrolyte batteries from Comparative Example 1 and Comparative Example 2. This was because as for the positive electrode active material-containing layers 62 in the nonaqueous electrolyte battery 1 from Examples 1 to 4, regarding the particle size distribution obtained by the laser diffraction scattering method, the average particle diameter $d_{50}$ was within a range of 1 µm to 5.5 µm, the maximum particle diameter was within a range of 10 µm to 100 µm, the particle diameter $d_{10}$ was within a range of 0.5 µm to 3 µm, and X, represented by $X=(d_{50}-d_{10})/d_{50}$, was within a range of 0.5 to less than 1, and thus the small particles of the conductive agent aggregated only a little, and the lithium-nickel composite oxide particles, which formed the positive electrode active material, were coated with the small particles of the conductive agent; as a result, the side reaction caused by the charge-and-discharge cycles could be suppressed and, at the same time, a good conduction path could be formed.

In particular, the nonaqueous electrolyte battery 1 from Example 3 exhibited a better cycle characteristic than those of Examples 1, 2 and 4. This is because the effect of coating the lithium-nickel composite oxide particles with the conductive agent could be more remarkably obtained, and thus the side reaction could be further suppressed by making the average particle diameter $d_{50}$ in the positive electrode active material-containing layer 62 in the particle size distribution smaller.

Note that, from the results of the particle size distributions in Example 1 and Example 2, it was found that if the number of revolutions in the sand grinder was decreased, the average particle diameter became larger and the value X became smaller. In addition, from the particle size distributions in Example 3 and Example 4, it was found that if the number of revolution in the mixer was decreased, the value X became smaller. For the nonaqueous electrolyte batteries 1 from Examples 2 and 4, however, the value X had values of 0.5 to less than 1, and thus they could exhibit a good cycle characteristic.

On the other hand, the nonaqueous electrolyte batteries from Comparative Examples 1 and 2 were inferior in the capacity retention ratio after 300 cycles to the nonaqueous electrolyte batteries from Examples 1 to 4.

In particular, the nonaqueous electrolyte battery from Comparative Example 1, having a value of X of 0.34, was very inferior in the capacity retention ratio after 300 cycles to batteries from Examples 1 to 4. This can be considered to be because in Comparative Example 1, the stirring step is omitted, thus resulting in occurrence of ununiform aggregation of the conductive agent particles.

This can also be found from FIG. 5 in which the particle size distribution in Example 1, shown by the solid line, has a gently sloping and broad peak which spreads in a small particle diameter area, and on the other hand the particle size distribution in Comparative Example 1, shown by the dotted line, does not have such a broad peak in the small particle diameter area. As described above, it can be considered that in the nonaqueous electrolyte battery from Comparative Example 1, the conductive agent particles aggregated nonuniformly, and thus the effect of coating the lithium-nickel composite oxide particles could not be obtained and the battery was deteriorated by the side reaction due to the charge-and-discharge cycles; as a result, the cycle characteristic thereof was remarkably inferior to those of the nonaqueous electrolyte batteries 1 from Examples 1 to 4.

The nonaqueous electrolyte battery from Comparative Example 2 had a value of X of 0.78, but the average particle size $d_{50}$ of the positive electrode active material-containing layer 62 in the particle size distribution was 7.0 µm, which was larger than 5.5 µm. This can be considered to be because in the nonaqueous electrolyte battery from Comparative Example 2, the particles of the lithium-nickel composite oxide were insufficiently dispersed and aggregated. For that reason, it can be considered that the nonaqueous electrolyte battery from Comparative Example 2 was deteriorated by the side reaction due to the charge-and-discharge cycle; as a result, the cycle characteristic thereof was inferior to those of the nonaqueous electrolyte batteries 1 from Examples 1 to 4.

Regarding the nonaqueous electrolyte battery according to at least one of the embodiments and Examples described above, X, represented by $X=(d_{50}-d_{10})/d_{50}$, is within a range of 0.5 to less than 1, and thus the at least one lithium-nickel composite oxide is coated with the small particles of the conductive agent. The nonaqueous electrolyte battery according to the embodiment, therefore, can exhibit a good charge-and-discharge cycle characteristic.

Note that, in Examples described above, the THINKY MIXER (ARE-250) is used. However, if a mixer, which can exhibit a performance as well as that of the THINKY MIXER, is used instead of the THINKY MIXER, a positive electrode having a particle size distribution described in embodiments can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positive electrode comprising a positive electrode current collector and a positive electrode active material containing layer formed on the positive electrode current collector, the positive electrode active material containing layer consisting of a binder and a mixture of particles of at least one lithium-nickel composite oxide and particles of a conductive agent;

wherein the mixture of the particles of the at least one lithium-nickel composite oxide and the particles of the conductive agent in the positive electrode active material-containing layer has such a particle size distribution obtained by a laser diffraction scattering method that an average particle diameter d50 is within a range of 1 µm to 5.5 µm, a maximum particle diameter is within a range of 10 µm to 100 µm, a particle diameter d10 is within a range of 0.5 µm to 3 µm, and X, represented by X=(d50−d10)/d50, is within a range of 0.70 to less than 1, a particle diameter of the particles of the conductive agent is smaller than an average particle diameter of the particles of the at least one lithium-nickel composite oxide, and the lithium-nickel composite oxide comprises at least one selected from the group consisting of Li—Ni—Al composite oxides, Li—Ni—Co—Mn composite oxides, and Li—Ni–Mn composite oxides.

2. The positive electrode according to claim 1, wherein the positive electrode active material containing layer has a content of nickel element within a range of 23% by weight to 45% by weight.

3. The positive electrode according to claim 1, wherein the conductive agent comprises a carbon material.

4. The positive electrode according to claim 3, wherein the carbon material is at least one selected from the group consisting of acetylene black, Ketjen black, furnace black, graphite, and carbon nanotube.

5. The positive electrode according to claim 1, wherein the positive electrode active material-containing layer has a density within a range of 2.4 g/cm3 to 3.6 g/cm3.

6. The positive electrode according to claim 1, wherein the binder comprises at least one selected from the group consisting of polyvinylidene fluoride, hexafluoropropylene, and polytetrafluoroethylene.

7. The positive electrode according to claim 1, wherein the average particle diameter d50 is within a range of 3.0 μm to 3.9 μm.

8. The positive electrode according to claim 1, wherein the particle diameter d10 is within a range of 0.90 μm to 1.51 μm.

9. The positive electrode according to claim 1, wherein the X is within a range of 0.70 to 0.73.

10. The positive electrode according to claim 2, wherein
the conductive agent comprises a carbon material, which is at least one of acetylene black, Ketjen black, furnace black, and graphite, and
the binder comprises at least one of hexafluoropropylene and polytetrafluoroethylene.

\* \* \* \* \*